United States Patent Office 2,751,934
Patented June 26, 1956

2,751,934

HYDROSTATIC COUPLING

Frank Stanley Saunders, Kingswood, England, assignor of one-half to Alltools Limited, Brentford, England Application June 3, 1954, Serial No. 434,225

Claims priority, application Great Britain July 27, 1953

3 Claims. (Cl. 137—791)

In United States Patent No. 2,667,184, I have described and claimed a pipe coupling for joining two members of a conduit for transmitting hydrostatic pressure and the object of the present invention is to provide an improved form of such pipe coupling designed for use in conduits for transmitting very high pressure such as might tend to force off the ends of the conduit members to be coupled from the diaphragms which seal said conduit members.

Two embodiments of pipe coupling in accordance with the present invention will now be described in detail, by way of example, with reference to the accompanying drawing, in which.

Like reference numerals designate like parts throughout the figures.

Figure 1:
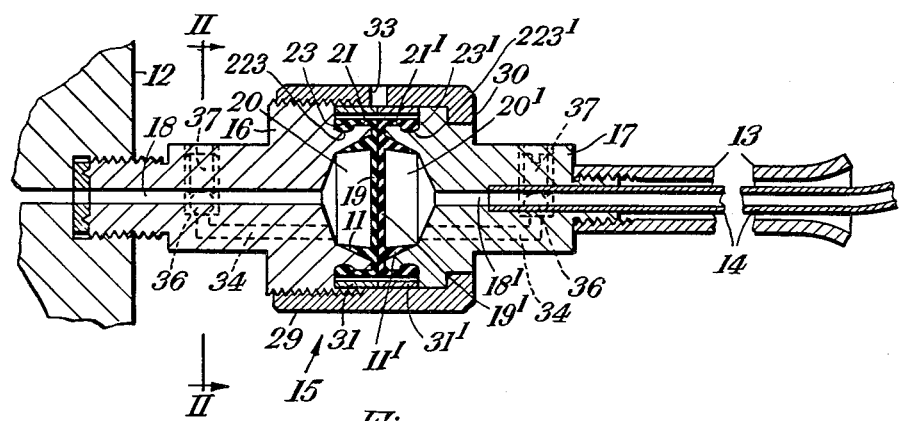
Fig. 1 is a section through the first form of pipe coupling.
Figure 2:
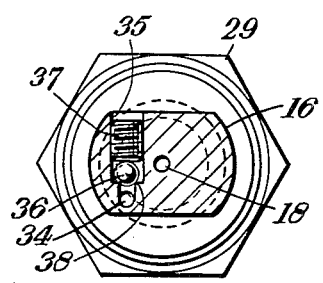
Fig. 2 is a section on the line II—II in Fig. 1.

Figs. 1 and 2 show a detachable pipe coupling 15 in a conduit for transmitting hydrostatic pressure from a weighing machine, part of which is indicated at 12, to a gauge (not shown). The coupling 15 connects a spigot end 16 projecting from the weighing machine to a spigot end 17 on a capillary tube 14.

The spigot end 16 has a narrow central bore 18 for the passage of the pressure transmitting liquid, which opens into a shallow recess 20. The open mouth of the recess 20 is sealed by a flexible diaphragm 19, which forms a liquid tight joint with the spigot end 16. To this end, the edge portion of the diaphragm is turned over to form an axially extending skirt portion 21, abutting against the outer surface of the spigot end and formed with a peripheral bead 23 which is retained in a circumferential groove 223 in the spigot end 16.

The spigot end 17 has a narrow central bore 18', into which is press fitted the end of the capillary tube 14. The bore 18' communicates with a shallow recess 20', precisely similar to the recess 20, and the end of the spigot end 17 is sealed by a rubber diaphragm 19', precisely similar to the diaphragm 19 and having a peripheral skirt portion 21' and a peripheral bead 23' engaging a circumferential groove 223' in the spigot end 17. Screwed to the spigot end 17 is a length of tubing 13 for protecting the adjoining end of the capillary tube 14.

The diaphragms 19, 19' are not bonded to the spigot ends 16, 17 being secured thereto solely by engagement of the peripheral beads 23, 23' on the diaphragms with the circumferential retaining grooves in the spigot ends.

The spigot end 16 is externally threaded and, to secure the spigot ends together, a union nut 29, having a flange 30, is fitted over the spigot end 17 and screwed to the spigot end 16 as shown in Fig. 1. Tubular metal distance pieces 31, 31' are fitted to the spigot ends, each of these surrounding but being disposed out of contact with the skirt portion of the associated diaphragm. These distance pieces 31, 31' serve to limit the clamping pressure which can be applied to the diaphragms 19, 19'. An air escape hole 33 is provided in the union nut 29, opposite the abutting ends of the distance pieces 31, 31', to permit of escape of air which may be trapped between the diaphragms 19, 19'. Each spigot end has an air bleeding vent 34 which leads from the recess therein, at a point near the periphery of the diaphragm, to an outlet 35 containing a ball valve 36 and a bleed screw 37 (see especially Fig. 2) which can be screwed in to hold the ball valve 36 against a seating 38.

The diaphragms 19, 19' are formed with annular flanges 11, 11' spaced inwardly from their skirt portions 21, 21'. The annular flanges are identical and only one will therefore be described. As will be clear from Fig. 1, the annular flange 11 tapers, being thickest when it joins the body portion of the diaphragm 19, and the recess 20 is correspondingly shaped, tapering gradually from the mouth of the spigot end 16 to conform with the shape of the outer wall of the flange 11 and tapering more sharply beyond the end of the flange to the narrow bore 18. When the diaphragm 19 is seated on the spigot end 16 and the conduit member is under pressure the inner wall of the flange defines a substantially cylindrical space containing liquid under pressure.

Figure 3:
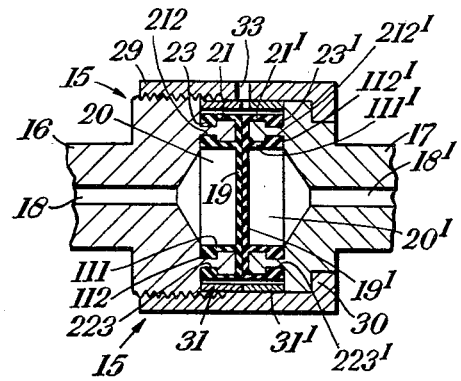
Fig. 3 is a section through the second form of pipe coupling.

The coupling shown in Fig. 3 differs from that shown in Figs. 1 and 2 only in the shape of the annular flanges 111, 111' on the diaphragms. Again one only of the flanges will be described in detail. The flange 111 is cylindrical and terminates in an outwardly projecting enlarged bead 112 engaging a circumferential retaining groove 212 in the inner wall of the spigot end 16. In this case the part of the recess 20 in the spigot end adjoining the mouth thereof is cylindrical and the recess tapers beyond the retaining groove to the narrow bore 18.

In both of the embodiments described the pressure of the liquid in the conduit holds the annular flange of each diaphragm firmly in engagement with the inner wall of the associated spigot end, thus holding the diaphragm firmly in position.

In both of the constructions described, the diaphragms are of suitable flexible material, for example material of synthetic rubber, polyvinyl chloride or nylon.

What I claim as my invention and desire to secure by Letters Patent is:

1. In a conduit for transmitting hydrostatic pressure, the combination of two separable conduit members each having a spigot end, the spigot end of each conduit member having a narrow bore and a wider recess communicating with said bore, a pair of flexible diaphragms, each diaphragm covering one of said spigot ends and having a body portion covering and sealing the recess in said spigot end, a skirt portion extending axially of said spigot end in contact with the outer wall of said spigot end, an enlarged bead on said skirt portion accommodated in a circumferential retaining groove in said outer wall and an annular flange extending from said body portion at a location spaced inwardly from said skirt portion and adapted to be maintained by the pressure in the conduit in engagement with the recess in the associated spigot end, and a detachable coupling member adapted to fit over the spigot ends to secure them together end to end with the body portions of the two diaphragms in close abutment.

2. A pipe coupling according to claim 1, comprising spacing means between said coupling member and the skirt portions of said diaphragms, said spacing means being spaced from said skirt portions and preventing the application of excessive clamping pressure to said diaphragms.

3. A pipe coupling according to claim 1, in which the annular flange on each diaphragm is cylindrical and has an enlarged bead engaging a circumferential retaining groove in the inner wall of the associated spigot end.

References Cited in the file of this patent

UNITED STATES PATENTS

| | | |
|---|---|---|
| 486,839 | McNeil | Nov. 22, 1892 |
| 1,885,457 | Lord et al. | Nov. 1, 1932 |
| 2,367,776 | Hollerith | Jan. 23, 1945 |
| 2,371,632 | Lippincott | Mar. 20, 1945 |
| 2,642,747 | LeVan | June 23, 1953 |
| 2,667,184 | Hailer et al. | Jan. 26, 1954 |

FOREIGN PATENTS

| | | |
|---|---|---|
| 577,283 | Great Britain | May 13, 1946 |